United States Patent

[11] 3,584,982

| [72] | Inventor | Arthur D. Siegel<br>22 Elston Road, Upper Montclair, N.J. 07043 |
|---|---|---|
| [21] | Appl. No. | 795,555 |
| [22] | Filed | Jan. 31, 1969 |
| [45] | Patented | June 15, 1971 |

[54] GAS PUMP
2 Claims, 3 Drawing Figs.

[52] U.S. Cl. .................................................. 417/464, 92/119
[51] Int. Cl. .................................................. F04b 19/02, F04b 29/00, F01b 15/04
[50] Field of Search.......................................... 103/158, 159, 163, 174, 188; 230/175; 92/118, 119; 417/464, 465

[56] References Cited
UNITED STATES PATENTS

| 2,013,478 | 9/1935 | Read ............................ | 103/159 |
| 3,006,282 | 10/1961 | Sisson........................... | 103/216 M |
| 3,111,259 | 11/1963 | Demay .......................... | 230/190 |
| 3,246,604 | 4/1966 | Brailsford..................... | 103/159 |
| 3,320,902 | 5/1967 | Paschke ....................... | 103/178 |

FOREIGN PATENTS

| 884,556 | 12/1961 | Great Britain................ | 103/174 |

Primary Examiner—Carlton R. Croyle
Assistant Examiner—John J. Vrablik
Attorney—Towson Price ABSTRACT: An air compressor or gas pump, especially adapted for use in aerating aquariums comprising, a piston, pivoted with "O" rings as sealing means in grooves therein, reciprocable in said cylinder, an exhaust valve for the cylinder, means to simultaneously oscillate and reciprocate the piston in said cylinder to cause gas to be drawn to said cylinder, compressed, and flow to said exhaust valve, said piston having an inlet passage to admit said gas to said cylinder, and the means to oscillate and reciprocate said piston is an eccentric having a flat on one side that uncovers the inlet passage in the piston at the beginning of the intake stroke and closes it at the end of said intake stroke, forming a valve for said inlet passage, closing it during compression of gas and opening it during admission of gas to be compressed.

PATENTED JUN 15 1971　　　　　　　　　　　　3,584,982

INVENTOR
ARTHUR D. SIEGEL

BY Towson Price
ATTORNEY

GAS PUMP

SETTING AND OBJECTS OF INVENTION

This invention relates to a miniature piston gas pump, especially adapted for use in supplying air to aquariums.

Aquarium pumps now used to deliver large quantities of air for 15 to 20 tanks are of the piston-cylinder type. Each has a leather washer piston reciprocating in a brake cylinder. The washer is driven from a motor-powered crankshaft. Such pumps have external exhaust valves and the rocking motion of the piston admits air to the cylinder.

The major disadvantages of such pumps is the rapid wear of the washer and resultant loss of air delivery. Rapid wear results from almost line engagement of the washer with the cylinder, causing high contact pressure. Because of high contact pressure the pump speed must be reduced, as by means of a belted reduction drive. As the cylinders are fixed in position, there is considerable side thrust on the piston washers during the stroke, causing additional wear.

Ideally, in all piston pumps the air intake valve should be open during the entire intake stroke. Many piston pumps have an intake port that is uncovered when the piston reaches the end of the intake stroke. This frequently means that a partial vacuum is formed in the cylinder before the inlet valve is opened, resulting in a noisy inrush of air upon opening of the valve.

It is an object of this invention to provide a piston pump with an intake valve that opens at the beginning of the intake stroke and remains open until the piston is at the end of said stroke.

Another object of the invention is to provide a piston pump with an eccentric that serves to reciprocate the piston as well as to function as an inlet air valve.

A further object of the invention is to provide a piston pump that can be operated without speed reduction at say a standard motor speed of 1550 r.p.m.

A still further object of this invention is to provide a piston pump with piston and cylinder that can be injection molded from thermoplastic materials.

Another object of the invention is to provide a piston pump that can operate when using standard "0" ring piston seals.

The objects of this invention are accomplished by providing a pump that has a piston of circular cross section having two rubber O-rings installed in grooves therein. An eccentric reciprocates the piston in its cylinder. The eccentric has a desirably flat side which permits air to enter the cylinder through a passage in the center of the piston when said side is opposite the piston passage. The function of the eccentric is thus to not only reciprocate the piston, but to let air into the cylinder in preparation for the compression stroke.

Two rubber O-rings are desirably used and float on the piston. This means that the inside diameter of each ring is larger than that of its groove, so that it fits loosely on the piston, while the outside diameter is in contact with the cylinder wall. The advantage of a floating ring, as opposed to a ring that fits tightly on the piston, is that a much larger compression can be tolerated on the ring without excessive ring pressure or friction on the cylinder wall. Also, the cylinder bore dimension can then vary over a wider range than if the rings fit tightly on the piston. Wider tolerances mean that the cylinder can be injection molded from thermoplastics rather than machined.

Because the rings are floating, the piston can rock in the cylinder as the piston reciprocates. For this reason the upper and lower piston ring flanges are reduced in diameter to prevent contact with the cylinder during operation. The cylinder is also free to move sideways so that it can align with the piston, thus minimizing wear due to misalignment and permitting operation at higher speeds than now possible.

In the drawings, wherein like reference characters denote like parts in the several views:

DESCRIPTION OF A PREFERRED EMBODIMENT

Figure 1:
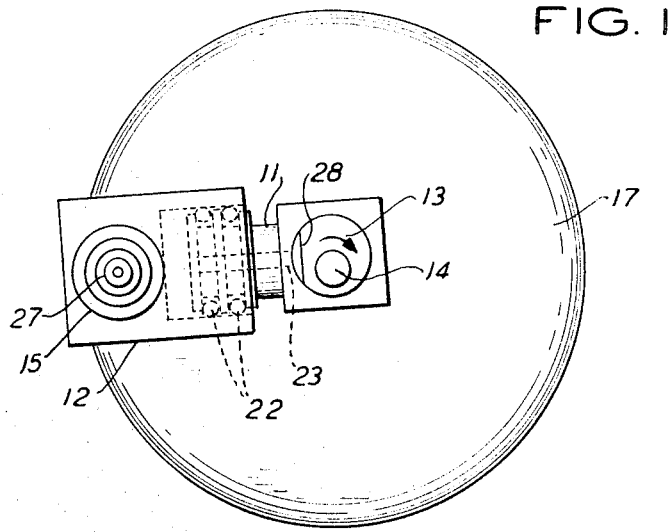
FIG. 1 is a top plan of a gas pump embodying my invention, with its piston moving out of the cylinder as on an intake stroke.
Figure 2:
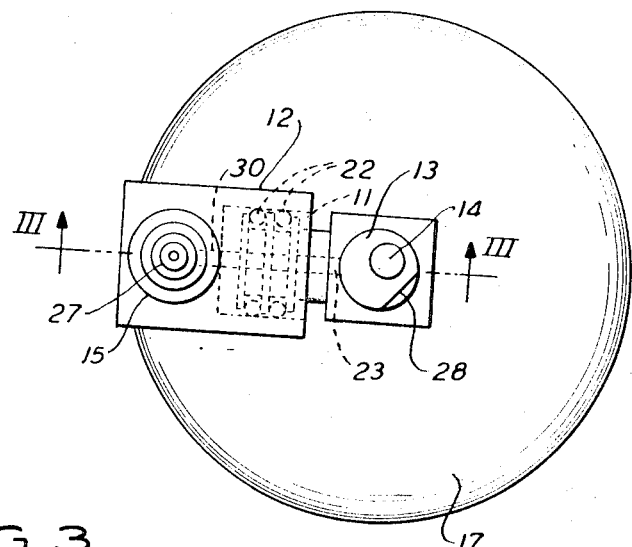
FIG. 2, is a top plan of said pump, with its piston moving into its cylinder as on a compression stroke.

Referring to the drawings and first considering FIG. 2, the cylindrical piston 11 is driven into its cylinder 12 by the rotation of a truncated offset block or eccentric 13 about its center 14. The center 14 is also on the axis of the carrying output or armature shaft 16 of the drive motor 17, intended to run clockwise, as viewed in FIGS. 1 and 2. Except for the shaft-receiving aperture, the eccentric is imperforate and rotate in an encircling band extending from the piston. Cylinder 12 may accommodate the sideward motion of the piston by rocking on a pivot member 15, here shown as carried on a threaded stud 18 upstanding from the motor 17. The stud 18 carries an adjusting nut 19 and washer 21 serving to position and hold the pivot 15 in the place desired. The cylinder 12 may, when and if desired, be locked against such rocking by sufficiently tightening the nut 19 to cause the washer 21 to frictionally grip the cylinder. The pivot member 15 maintains a gastight fit with the cylinder 12. Rubber O-rings 22 on the piston 11 maintain a gastight seal with the cylinder 12.

On the compression stroke, illustrated in FIG. 2, air or other gas having been admitted as illustrated in FIG. 1, the piston 11 is driven into the cylinder 12, while the eccentric 13 covers the air inlet port 23 in the piston. Air or other gas in the cylinder 12 is compressed to a relatively great extent because the piston can closely approach the end wall of the cylinder, as the latter contains nothing, such as a return spring, which would limit compression of gas therein. The compressed gas is then forced out through the air outlet port 20 in the pivot 15 and the pressure thereof causes the valve 24, desirably formed of a suitable plastic, to lift off its seat 25, toward which it is biased by spring 26, releasing compressed gas to the delivery line 27, which may extend to water in an aquarium. The chamber for the valve 24 is here shown completed by a desirably plastic sleeve 31 which extends between the outer end of the pivot member 15 and the delivery line 27. It is connected to said parts by suitable means, including press fitting and/or adhesive, after the valve 24 is placed and the spring compressed to the desired extent.

Referring now to FIG. 1, as the piston 11, after reaching the end of compression stroke of FIG. 2 begins to move out of the cylinder 12, the exhaust valve 24 closes and the air inlet passage 23 through the center of the piston 11 is uncovered as the truncated desirably flat portion 28 on the accentric 13 passes over said inlet passage 23. It will be understood that the truncating of the cylinder need not be along a flat plane. Air is now free to pass along the accentric truncation 28, through inlet passage 23 in the center of piston and into the cylinder 12. Air continues to move into said cylinder until its piston 11 reaches the outer limit of its stroke.

Near said outer limit of the stroke, the eccentric flat 28 passes the inlet passage 23 and the cylindrical part of said eccentric covers said inlet passage for the duration of the compression stroke.

Figure 3:
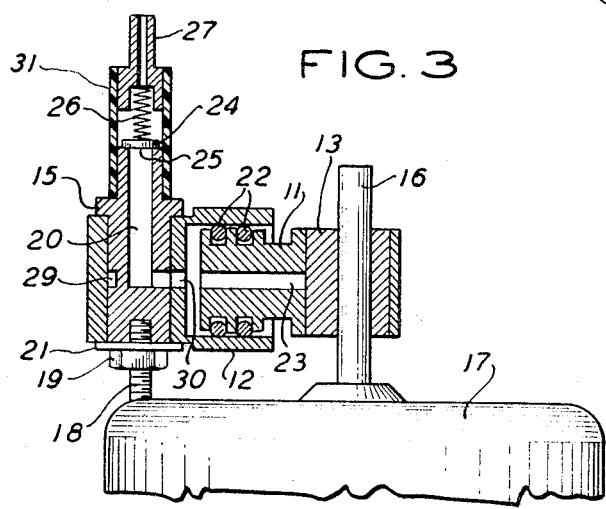
FIG. 3 is a vertical sectional view of the pump, on the line III—III of FIG. 2 in the direction of the arrows, showing details of its exhaust valve.

Referring to FIG. 3, the pivot 15 and its exhaust valve 24 are here shown in detail. A groove 29 cut in the pivot 15 insures that air can enter port 20 therein, no matter what the relative location of the port 30 in the cylinder 12 is with respect to the passage 20 in said pivot.

EXAMPLE

The piston and cylinder of the pump shown in FIGS. 1 and 2 were cast of Eccoslip TM-24, a teflon filled epoxy supplied by Emerson and Cuming, Canton, Mass. Two 0557-7 Neoprene O-rings were installed on the piston and lubricated with silicone grease. The pump was driven by a 1/100 HP, 1550 r.p.m. motor. With a displacement of 0.089 cubic inch and a compression ratio of 3.23/1, the pump delivered 113 cu. in. per minute of air against a pressure of 0.6 inch of mercury. With pump outlet closed the pressure was 12.0 inches of mercury.

Having now described my invention in detail in accordance with the requirements of the Patent Statutes, those skilled in the art will have no difficulty in making changes or modifications in the individual parts or their relative assembly in order to meet specific requirements or conditions. Such changes and modifications may be made without departing from the scope and spirit of the invention, as set forth in the following claims.

I claim:

1. A gas pump comprising a cylinder, a cylindrical piston reciprocable therein, a hollow pivot member with its pivot axis disposed beyond the confines of the cylinder, said cylinder being swingably carried on said pivot member which serves to carry gas therefrom, an exhaust valve for the cylinder, means to positively simultaneously oscillate and reciprocate the piston in said cylinder, to cause gas to be drawn to said cylinder, compressed and flow to said exhaust valve, said piston having an inlet passage to admit said gas to said cylinder, and the means to oscillate and reciprocate said piston being a solid rotatable shaft carrying an otherwise imperforate block forming a valve for said inlet passage, closing it during compression of gas and opening it during admission of gas to be compressed.

2. A gas pump as recited in claim 1, wherein a valve spring-biased to closed position is carried by said pivot member, and through which passes gas from the cylinder after compression therein.